Patented Sept. 20, 1932

1,878,887

UNITED STATES PATENT OFFICE

JAMES B. PIERCE, JR., AND ROBERT L. CURNES, OF CHARLESTON, WEST VIRGINIA, ASSIGNORS TO BARIUM REDUCTION CORPORATION, OF CHARLESTON, WEST VIRGINIA, A CORPORATION OF DELAWARE

METHOD OF PREVENTING SCUM AND EFFLORESCENCE ON BRICK AND CLAY WARE

No Drawing.    Application filed September 22, 1930.   Serial No. 483,749.

This invention relates to the prevention of scum, i. e., the coating which develops on the surface of brick and clay wares during drying or burning the same, and also the prevention of efflorescence on the same materials, i. e. the coating which develops on the surface thereof after removal of the same from the kiln and most generally after the materials have been set up in a wall and subjected to weathering conditions and which coatings are usually due to the formation of alkali-metal or alkaline-earth sulphates, and more commonly calcium sulphate which migrate to the surface of such materials.

It has heretofore been proposed to employ barium carbonate and other compounds of barium, more particularly barium sulphide and chloride, to prevent the formation of scum and efflorescence in brick and other ceramic products, reference being had in this connection to the Patent No. 1,583,903 and also to an article by Ellis Lovejoy, Transactions of the American Ceramic Society 1908, Vol. VIII. p. 255-265 entitled, "The use of barium compounds in preventing scum", as well as in the trade pamphlet by the same author dated 1927, in which articles Lovejoy as early as 1908 suggested the use of barium bi-carbonate and pointed out many of its theoretical advantages, without however, describing the procedure by which barium bi-carbonate could be utilized in order to realize such advantages. In a later article, 1927, Lovejoy, while still featuring the theoretical advantages of employing barium bi-carbonate for the above mentioned purposes, fails to outline a practical and feasible procedure of applying the same in the usual commercial plant for the manufacture of brick or ceramics, for example, he states with reference to scum formation, "A number of years ago we suggested the development of the unstable bi-carbonate of barium, which can be produced by roasting the carbonate with charcoal, or by passing the combustion gases from a non-sulphurous fuel through a slurry of the carbonate. It is not stable and cannot be produced and marketed because it rapidly oxidizes and returns to the less soluble carbonate form. Because of its unstable character little is known about it, but it proved effective in the worst instance of scum we have ever experienced,— a brick made from a mixture of clay and coal ash. Barium bi-carbonate would not be open to the objections of the other soluble barium salts in that it likely is less soluble and in that it soon returns to the carbonate. With proper equipment it would be a simple and safe method of increasing the activity of the carbonate if need be."

Again, with reference to the efflorescence, he states:

"Our first thought is to use some form of barium salt for the corrective. For treatment of burned clay wares we must use clear solutions. Barium carbonate is not sufficiently soluble and we have not the advantage of reactivity as in treating scum. The bi-carbonate will give us a stronger solution and we can precipitate the sulphur radical in the efflorescence and make it insoluble, but we leave soluble carbonates, except in the case of magnesium and calcium. Where the efflorescence consists largely of magnesium and calcium, we may expect results from the use of barium bi-carbonate. The barium chloride, fluoride and hydrate would themselves effloresce when in excess and we can have no measure of the quantity to use. Moreover, except in the case of the barium sulphate precipitate, the reactions produce soluble salts."

It will be noted Lovejoy carried on no investigation as to the conversion of normal carbonate to bi-carbonate. His statement that it can be produced by passing pure $CO_2$ gas through a suspension in water is entirely an abstract or theoretical speculation not operable insofar as scum prevention in practice is concerned, as there is never sufficient water added at the pug mill to permit of complete conversion of all the normal carbonate to bi-carbonate that is required for scum prevention.

Also, his statement that the bi-carbonate would be more useful for preventing efflorescence than the normal carbonate is totally erroneous, as there can be no bi-carbonate in the brick after even drying at 110° C. or higher and certainly not after burning at 1000°

C. or better. Bi-carbonate does prevent efflorescence better than normal carbonate because the normal carbonate resulting from the breaking down of the bi-carbonate in drying or burning is in a much more finely divided state and much more evenly and uniformly distributed throughout the mass of the brick or clay wares treated.

Our investigations have led to the discovery of a wholly practical and feasible procedure for the prevention of scum and efflorescence upon brick and other ceramics whereby scum formation and efflorescence is economically and effectively prevented or eliminated. In carrying out our invention, we preferably proceed as follows:—

When normal barium carbonate is employed, it is common practice to use a 25 to 50% excess over that theoretically required to precipitate all the soluble sulphates in the clay, this large excess being necessary due to the insolubility and consequent impossibility of the reaction

$$BaCO_3 + ASO_4 = ACO_3 + BaSO_4$$

proceeding to completion in the time and under the conditions pertaining in the manufacture of brick and ceramic ware.

If barium bi-carbonate could be substituted in whole for the barium carbonate it would react instantly in the above reaction just as any other soluble barium salt would, but this is not feasible since there is always present a greater amount of soluble sulphates than is required to satisfy the barium bi-carbonate formed in the amount of water used to pug the clay. We have, however, discovered that if only as little as 20% of the carbonate required to theoretically combine with the sulphate is present as bi-carbonate that all the advantages are to be had just the same as if the theoretical amount of barium was present as bi-carbonate. To bring this about we proceed as follows:—

A determination of the $SO_3$ content of the clay which is utilized in the manufacture of the brick and the water used in pugging is made and based on this determination the amount of barium carbonate theoretically required to react with and precipitate all of the ($SO_3$) radical of the clay is added directly to the water, usually about 500 to 1,000 lbs. of water being employed per thousand brick which is used to "pug" the clay. The thorough suspension of the carbonate in the water is obtained by suitable agitation. Waste kiln gases, which usually contain from 8% to 15% $CO_2$ and which have been previously carefully scrubbed, first with water to remove soot and entrained ash and then with a weak suspension of barium carbonate in water to remove sulphur dioxide, are then caused to pass into the mixture of barium carbonate suspended in the water as aforesaid. While we prefer to employ precipitated barium carbonate in the above operation, because the ease with which it can be converted into bi-carbonate, due to the smaller dimensions of its particles and more amorphous physical structure thereof, other forms of barium carbonate, such as witherite may be employed, if desired. The reaction is allowed to continue until equilibrium at atmospheric pressure is reached, the temperature of the mixture being preferably maintained at 15° C. to 20° C., which reaction is represented by the following equation:—

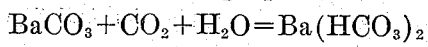
$$BaCO_3 + CO_2 + H_2O = Ba(HCO_3)_2$$

After equilibrium has been reached under the above conditions of temperature and pressure, it will be found that a solution of $Ba(HCO_3)_2$ in water exists approximating 0.24% or, in terms of $BaCO_3$, 0.18% i. e. from 25% to 50% of the barium carbonate in the original suspension has been converted to bi-carbonate and passed into solution. For instance, if the clay required five pounds of $BaCO_3$ per thousand brick, the 750 pounds of water would contain 0.18% $BaCO_3$ or 1.35 pounds which would be 27% of the 5 pounds originally in suspension.

This mixture of bi-carbonate in solution and carbonate in suspension is now mixed with the clay at the pug mill, when the following reactions take place:

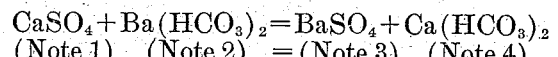
$$CaSO_4 + Ba(HCO_3)_2 = BaSO_4 + Ca(HCO_3)_2$$
(Note 1)   (Note 2)   = (Note 3)   (Note 4)
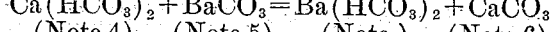
$$Ca(HCO_3)_2 + BaCO_3 = Ba(HCO_3)_2 + CaCO_3$$
(Note 4)   (Note 5)   (Note )   (Note 6)
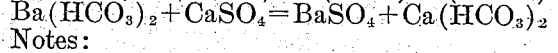
$$Ba(HCO_3)_2 + CaSO_4 = BaSO_4 + Ca(HCO_3)_2$$
Notes:

1—Soluble 1 part in 500 water at 18° C.
2—Soluble 1 part in 450 water at 15° C. and 0 partial pressure $CO_2$
3—Soluble 1 part in 432,000 water at 19° C.
4—Soluble 1 part in 2,600 water at 15° C. and 0 partial pressure $CO_2$
5—Soluble 1 part in 45,500 water at 18° C.
6—Soluble 1 part in 89,000 water at 20° C.

(Above solubilities, except that of

$$Ba(HCO_3)_2$$

from Seidell's "Solubilities of Inorganic and Organic Substances").

The above noted reactions are equally applicable to all sulphates of the alkali and alkaline-earth metals.

The barium bi-carbonate acts cyclically as explained in reactions on page 5 ante, since the small portion thereof first reacts with a portion of the calcium sulphate to form calcium bi-carbonate which, in turn reacts with the barium carbonate to form another portion of barium bi-carbonate, whereupon the cycle of reaction is repeated. As a consequence, notwithstanding the fact that the amount of barium bi-carbonate may be far less than that which will be required to satisfy all of the calcium sulphate and sulphuric acid present in the pugging mill, the net result of the cycle of reactions of both the barium carbonate and barium bi-carbonate are brought into action through this barium bi-carbonate catalyzer.

To substantiate theoretically our foregoing statements we give below results of a series or reactivity tests on substantially equal molal solutions of calcium, magnesium and sodium sulphates, which show the difference in reactivity between bi-carbonate and carbonate suspension, normal precipitated carbonate and witherite. The barium carbonate in the suspension used was 27.0% converted to bi-carbonate and 73.0% normal carbonate. Temperature of all tests 24° C.

*Calcium sulphate:*
Concentration: 0.002086 gms. $CaSO_4$ per cc. equivalent to 0.003024 gms. 100% $BaCO_3$

| Time minutes | Per cent reacted with theoretical amount of 27.0 per cent bicarbonate—carbonate suspension | Per cent reacted with theoretical amount barium carbonate (98.0 per cent $BaCO_3$) | Per cent reacted with theoretical amount air floated witherite (87.56 per cent $BaCO_3$) | Per cent reacted with air witherite same weight as theoretical barium carbonate |
| --- | --- | --- | --- | --- |
| 15 | 85.8 | 11.7 | 7.39 | 6.10 |
| 30 | 91.5 | 28.4 | 13.61 | 9.7 |
| 60 | 93.5 | 40.2 | 22.15 | 17.9 |

*Magnesium sulphate:*
Concentration: 0.001823 gms. $MgSO_4$ cc. equiv. to 0.002989 gms. $BaCO_3$ 100%

| Time minutes | Per cent reacted with theoretical amount of 27.0 per cent bicarbonate—carbonate suspension | Per cent reacted with theoretical amount barium carbonate (98.0 per cent $BaCO_3$) | Per cent reacted with theoretical amount air floated witherite (87.56 per cent $BaCO_3$) | Per cent reacted with air witherite same weight as theoretical barium carbonate |
| --- | --- | --- | --- | --- |
| 15 | 95.5 | 24.4 | 19.4 | 18.0 |
| 30 | 96.1 | 31.5 | 22.5 | 21.6 |
| 60 | 97.3 | 47.2 | 27.7 | 24.2 |

*Sodium sulphate:*
Concentration: 0.002199 gms. $Na_2SO_4$ cc. equiv. to 0.003056 gms. 100% $BaCO_3$

| Time minutes | Per cent reacted with theoretical amount of 27.0 per cent bicarbonate—carbonate suspension | Per cent reacted with theoretical amount barium carbonate (98.0 per cent $BaCO_3$) | Per cent reacted with theoretical amount air floated witherite (87.56 per cent $BaCO_3$) | Per cent reacted with air witherite same weight as theoretical barium carbonate |
| --- | --- | --- | --- | --- |
| 15 | 95.5 | 38.4 | 22.9 | 21.4 |
| 30 | 96.0 | 52.2 | 26.4 | 24.2 |
| 60 | 96.2 | 66.2 | 31.4 | 29.1 |

From these tests it can be seen that the reactivity of a 27.0% bicarbonate suspension is practically that of a soluble barium salt, i. e. 100%, and that we have evolved a process for making the normal barium carbonate practically 100% reactive for the prevention of scum and efflorescence in brick and clay wares generally.

Although we preferably convert but about 20% to 30% of the barium carbonate into bicarbonate, nevertheless without departing from the spirit of my invention up to approximately 60% of the barium carbonate introduced in suspension can be converted into barium bicarbonate, but as explained ante, unless the barium carbonate is converted in part into barium bicarbonate, the desired cyclic reaction cannot occur and a very incomplete conversion of the soluble sulphates into insoluble barium sulphate is accomplished. While we prefer to employ substantially pure kiln gases for the conversion of the barium carbonate into bicarbonate, we do not limit ourselves thereto, as carbon dioxide gas substantially free from deleterious ingredients can be employed in lieu thereof, if desired, and wherever the active substantially pure carbon dioxide is employed in the claims, we refer to carbon dioxide free from impurities which would be deleterious to accomplishing the desired objects of this process.

The expression "pugging" as used in the appended claims refers to the well known practice of incorporating clay with water prior to the shaping of the same to the desired form.

Various changes and proportions of the ingredients employed and in the procedure, within the scope of the appended claims may be made without departing from the spirit of our invention.

Having thus described our invention what we claim and desire to obtain by United States Letters Patent is:—

1. The method of treating clay to prevent scum formation and efflorescence subsequent to the firing thereof in the manufacture of brick or clay wares, which comprises passing a gas containing $CO_2$ gas, at a pressure not exceeding atmospheric pressure, through a suspension of barium carbonate, the amount of the barium radical in such carbonate being substantially sufficient to combine with the $SO_3$ radical of the water soluble sulphates in a batch of clay to be pugged and the amount of $CO_2$ gas reacting with the barium carbonate being sufficient to but partially convert the barium carbonate in suspension into soluble barium bicarbonate, pugging the batch of clay with the aqueous mixture so obtained and allowing the reaction therein to proceed until substantially all of the soluble sulphates in the mixture react with the barium bicarbonate formed therein to produce precipitated barium sulphate.

2. The method of treating clay to prevent scum formation and efflorescence subsequent to the firing thereof in the manufacture of brick or clay wares, which comprises passing a gas containing $CO_2$ gas, at a pressure not exceeding atmospheric pressure, through a suspension of barium carbonate, the amount of the barium radical in such carbonate being substantially sufficient to combine with the $SO_3$ radical of the water soluble sulphates in a batch of clay to be pugged and the amount of $CO_2$ gas reacting with the barium carbonate being sufficient to convert but a portion, not exceeding 60%, of the barium carbonate in suspension, into the soluble barium bicarbonate, pugging the batch of clay to be pugged with the aqueous mixture so obtained and allowing the reaction therein to proceed until substantially all of the soluble sulphates in the mixture react with the barium bicarbonate formed therein to produce precipitated barium sulphate.

3. The method of treating clay to prevent scum formation and efflorescence subsequent to the firing thereof in the manufacture of brick or clay wares, which comprises passing a gas containing $CO_2$ gas, at atmospheric pressure through suspension of barium carbonate, the amount of the barium radical in such carbonate being substantially sufficient to combine the $SO_3$ radical of the water soluble sulphates in a batch of clay to be pugged and the amount of $CO_2$ gas reacting with the barium carbonate being sufficient to convert a minor portion, between 20% and 30%, of the barium carbonate in suspension into soluble barium bicarbonate, pugging the batch of clay with the aqueous mixture so obtained and allowing the reaction therein to proceed until substantially all of the soluble sulphates in the mixture react with the barium bicarbonate formed therein to produce precipitated barium sulphate.

Signed at Charleston in the county of Kanawah and State of West Virginia, this 15th day of September, 1930.

JAMES B. PIERCE, Jr.
ROBERT L. CURNES.